Jan. 23, 1923.
W. R. HOSE.
WHEEL GAUGE.
FILED MAY 7, 1920.
1,443,131.
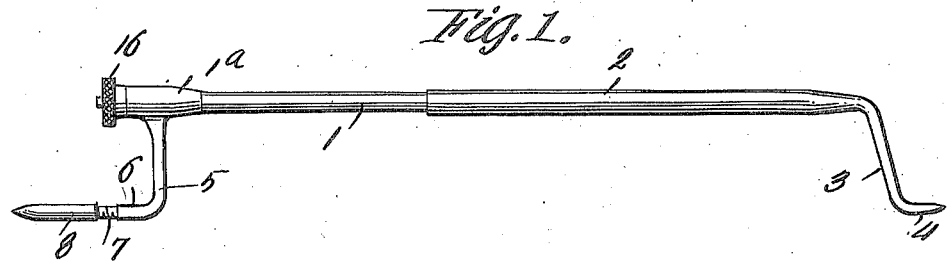
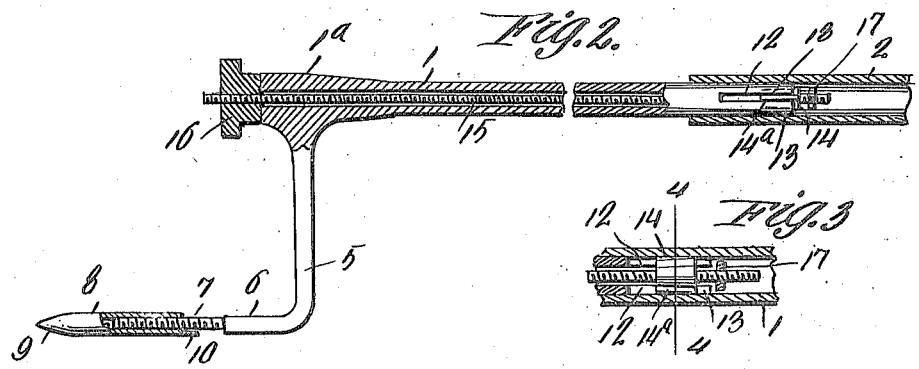
WITNESSES
Guy M. Spring
S. M. McColl
Inventor
WALTER R. HOSE
By Richard B. Owen
Attorney Patented Jan. 23, 1923.

1,443,131

UNITED STATES PATENT OFFICE.

WALTER R. HOSE, OF WINONA, MINNESOTA.

WHEEL GAUGE.

Application filed May 7, 1920. Serial No. 379,567.

*To all whom it may concern:*

Be it known that I, WALTER R. HOSE, a citizen of the United States, residing at Winona, in the county of Winona and State of Minnesota, have invented certain new and useful Improvements in Wheel Gauges, of which the following is a specification.

This invention relates to wheel gauges for measuring the adjustment of wheels in relation to each other.

The object of the invention is to provide a simple and efficient device of this character for lining up front wheels on automobiles so that the mechanic can determine just how much the wheels should toe in to keep the wear off the tires, and also to obtain the right resistance for steering purposes.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings;

Fig. 1 represents a side elevation of a gauge constructed in accordance with this invention.

Fig. 2 is a longitudinal section with parts broken out.

Fig. 3 is a detail sectional view.

Fig. 4 is a transverse section taken on the line 4—4 of Fig. 3.

Fig. 5 is an enlarged detail side elevation of one of the parts of the gauge; and Fig. 6 is a transverse section taken on the line 6—6 of Fig. 5.

In the embodiment illustrated the main body portion of the instrument is made of two relatively long telescoping tubular members 1 and 2, the member 2 having a laterally extending obtuse angled arm 3 at its outer end, said arm having a terminal finger 4 arranged parallel with the body portion of the member 2 projecting longitudinally outward and pointed as shown clearly in Fig. 1.

The member 1 has a bore extending longitudinally from end to end and the outer end thereof is enlarged as shown in 1ª and provided with a laterally extending right angularly disposed arm 5. This arm 5 has a forwardly and longitudinally extending terminal finger 6 arranged parallel with the body portion of the member 1 with its outer end reduced and threaded as shown at 7. This threaded finger end 7 is designed to receive an adjustable sleeve-like element 8 which has threaded connection therewith with its outer end closed and pointed as shown at 9, and an indicating pointer 10 formed on its inner end. This pointer 10 is designed to cooperate with the scale 11 formed on a flattened portion of the member 7, as is shown clearly in Fig. 5. This scale 11 may be divided into thirty seconds of an inch, and after the members 1 and 2 have been approximately adjusted between the wheels to be gaged, the accurate adjustment is obtained by means of this sleeve-like member 8.

The inner end of member 1 is provided with diametrically opposite longitudinally disposed slots 12 which open through said end and are designed to receive oppositely disposed ribs 14 and 14ª carried by a wedge-like member 13, which is adapted to be inserted in the split end of the member 1 and force the walls thereof into binding engagement with the inner face of the member 2 to hold the members 1 and 2 in adjusted position.

A threaded rod extends longitudinally through the member 1 and projects at both ends beyond the ends of said member, the inner end of said rod carrying the spreading member or wedge 13, and having a head 17 for preventing the wedge from coming off the rod. The outer end of the rod 15 has a nut 16 mounted thereon and when this nut is turned to draw the rod 15 outwardly the wedge 13 will be moved into the split end of member 1 to force said end into locking engagement with member 2.

From the above description it will be obvious that in the operation of this device the pointed ends of the fingers 4 and 8 are engaged with the inner faces of the rims of the wheels to be gaged. The members 1 and 2 having been spread apart a sufficient distance to properly position the instrument. These members are held in adjusted position by the means above described, and after they have been so adjusted, the sleeve-like member 8 is turned on the finger 7 and a reading of scale 11 will indicate the adjustment to be made.

From the foregoing description, taken in connection with the accompanying drawings, the advantages of the construction and the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

What is claimed is:—

1. A wheel gauge comprising a member having wheel engaging arms, one of said arms being screw threaded, said thread being removed along one side of the arm to provide a flat surface having a scale thereon, and a sleeve like element threaded on said arm and having a pointer to cooperate with said scale.

2. A device of the class described comprising two axially movable telescopically engaged members equipped with means for holding them in adjusted position, one of said members having a laterally extending arm at its outer end, said arm having a terminal finger approximately parallel with the body of the member with its point extending outward, the other member having an L-shaped arm extending outward, the outer end of which is threaded and provided with a scale on one face and a sleeve having threaded engagement with said end, and provided with a pointer for cooperation with said scale.

3. A device of the class described comprising a pair of telescopically engaged axially movable members, the inner member having its inner end slit longitudinally, a threaded rod extended longitudinally through said inner member, a wedge carried by the inner end rod and operable in the slit end of the inner member, a nut adapted to be mounted on the outer end of the threaded rod to abut the outer end of said inner member, and a measuring point carried by each of said movable members.

4. A wheel gauge comprising a pair of tubular telescopically engaged axially movable members each being provided with wheel engaging means, one member having a longitudinally extending slot in its inner end to render the same expansible, a rotatable threaded rod extending longitudinally through said member, a spreading wedge carried by said rod and having a portion thereof operable in said slot, said wedge being adapted to move into the expansible end of said member and means threaded on the rod and adapted to cause relative movement between said rod and said wedge.

In testimony whereof I have affixed my signature in presence of two witnesses.

WALTER R. HOSE.

Witnesses:
EARL SIMPSON,
MINNIE WITT.